Aug. 1, 1961   F. E. MUNSCHAUER, JR   2,994,229
AUTOMATIC TRANSMISSION MEANS FOR PRESS BRAKES
Filed July 10, 1959   2 Sheets-Sheet 1
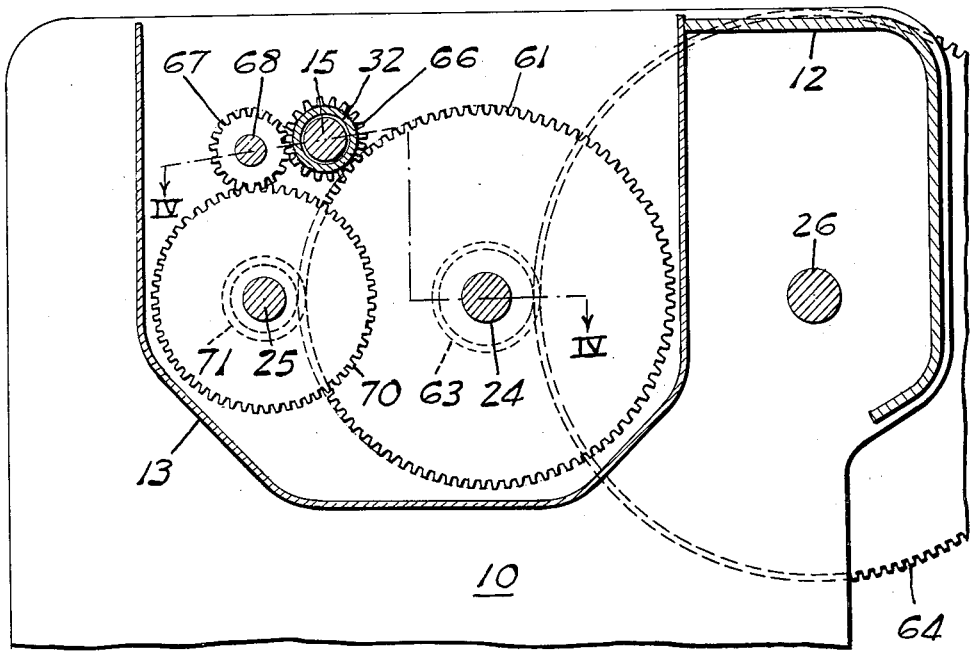
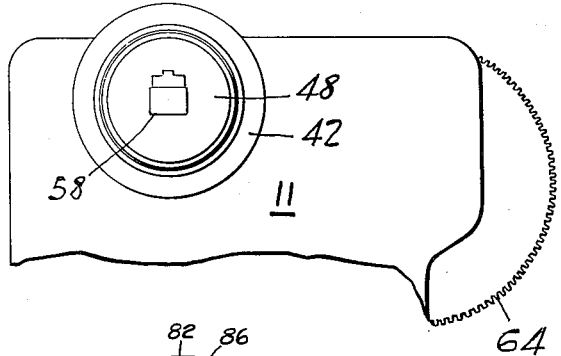
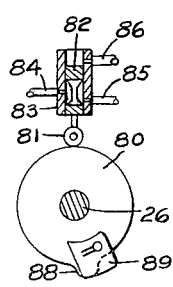
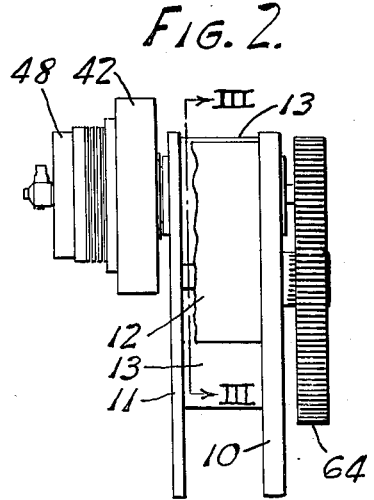
INVENTOR.
FREDERICK E. MUNSCHAUER JR.
BY
Bean, Brooks, Buckley & Bean
ATTORNEYS

United States Patent Office 2,994,229
Patented Aug. 1, 1961

2,994,229
AUTOMATIC TRANSMISSION MEANS FOR PRESS BRAKES
Frederick E. Munschauer, Jr., Eggertsville, N.Y., assignor to Niagara Machine & Tool Works, Buffalo, N.Y.
Filed July 10, 1959, Ser. No. 826,170
8 Claims. (Cl. 74—330)

This invention relates to press brakes for fabricating sheet metal and more particularly to a novel automatic two-speed power transmission for such press brakes.

In press brakes the working stroke of the ram or movable member of the press brake involves considerable vertical movement since the ram in its upper position must allow sufficient space for introduction and removal of workpieces. It is only the final portion of the down stroke of the ram which normally effects the actual bending of the sheet metal and in this final portion the ram movement must be relatively slow to avoid whipping of the workpiece which results in kinks therein and other undesirable defects and is also hazardous to the operators of the press brake. If such ram moves constantly downward at a speed which is desirable for the actual bending operation then the time of the entire downward movement is relatively long and the operation is slow.

It has heretofore been contemplated to provide press brakes with transmission means whereby the approach portion of the down stroke is faster than the final working portion to reduce the over-all time consumed in effecting a complete cycle of operation.

The present invention relates to novel automatic power transmission means which produce a ram stroke wherein the ram moves downwardly at a given relatively rapid speed until the final working portion and then continues its downward movement through the working portion at a slower speed.

The transmission of the present invention accomplishes the foregoing two-speed drive from a relatively rapidly rotating flywheel shaft to a crankshaft or main shaft through a reducing gear arrangement which is relatively more direct and consequently more efficient in design and operation than comparable two-speed press brake transmission arrangements of the prior art.

While a single specific embodiment of the principles of the present invention is illustrated in the accompanying drawings and described in detail in the following specification, it is to be understood that such embodiment is by way of example and that the invention is not limited to the details of the disclosure, apart from the specific gearing relationships which form the subject matter of the invention, and the spirit and scope of the invention are not limited excepting as defined in the appended claims. Furthermore, only such portions of a complete press brake are illustrated and described as are incident to the invention and the manner in which the transmission means of the present invention will be incorporated in an otherwise conventional power press brake will be obvious to one skilled in the art to which the invention pertains.

FIG. 1 is a side elevational view of the upper portion of the right-hand side frame assembly of one form of the power press brake of the present invention viewed from the inner side thereof;

FIG. 2 is a front elevational view of the upper portion of such right-hand side frame assembly;

FIG. 3 is a cross-sectional view taken generally on the line III—III of FIG. 2 but on a somewhat larger scale;

FIG. 5 is a somewhat schematic showing of a cam control for the clutch operating fluid pressure.

Figure 4:
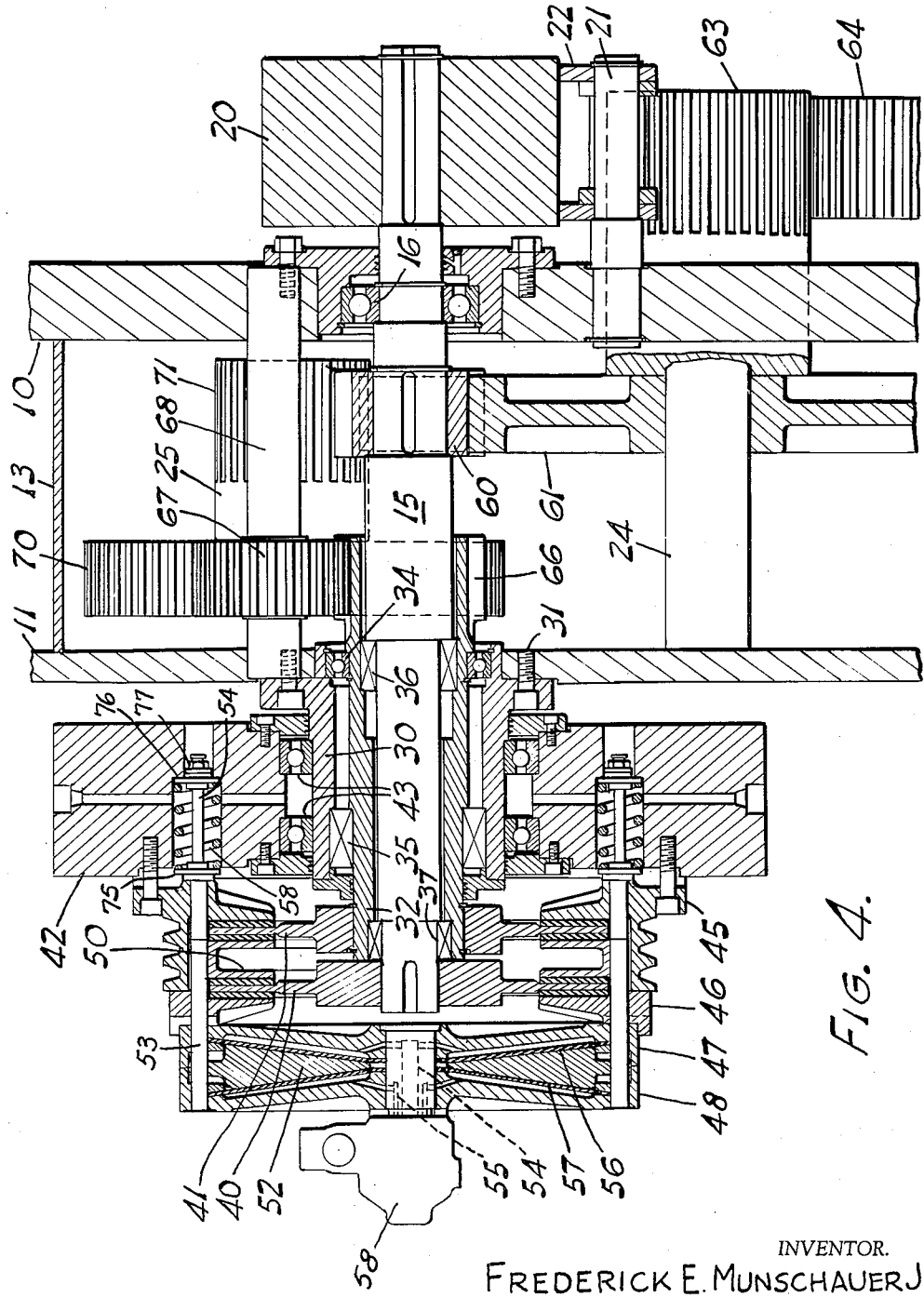
FIG. 4 is a horizontal cross-sectional view taken partially and approximately on the irregular line IV—IV of FIG. 3.

The novel drive means of the present invention is for use in power press brakes which are otherwise of generally conventional construction and accordingly the drawings herein illustrate only the right-hand upper side frame portion of a conventional power press brake embodying the novel drive means which forms the subject matter of the invention. In the present instance this right-hand side frame comprises a double-wall structure including a relatively heavy outer plate member 10 and an inner plate member 11 which in the present instance is somewhat lighter than the outer plate member.

The plate members 10 and 11 are held in rigid spaced relationship by various cross bracing means and the present drawings illustrate only the upper spacing and cross bracing means. A plate member 12 is welded in edgewise abutment against the inner surfaces of the outer plates 10 and extends across the machine while a generally U-shaped plate member 13 which is welded in edgewise abutment with the facing surfaces of plate members 10 and 11 forms a well or housing portion for certain of the transmission components of the present drive means in addition to integrating the upper portions of the plate members 10 and 11.

Included in the drive means of the present invention is a flywheel shaft 15 which has anti-friction bearing support in the plate member 10 as at 16 and is indirectly rotatably supported in plate member 11 in a manner which will presently appear. Flywheel shaft 15 projects inwardly of the frame members (to the left as viewed in FIGS. 2 and 4) for supporting flywheel and clutch means which will presently be described and projects outwardly of the framing means (to the right as viewed in FIGS. 2 and 4) where it has fixed thereto a cylindrical brake collar designated 20 in FIG. 4. The brake means is entirely conventional and in FIG. 4 the numeral 21 designates a brake shoe pivot pin which is mounted upon side frame member 10 and supports brake shoes which are indicated generally at 22.

In addition to the flywheel shaft 15, the side frame members 10 and 11 support an intermediate shaft 24 and what may be termed a reducer or low speed shaft 25 which comprises a supplementary intermediate shaft. The final drive shaft of the power press brake, usually referred to as the main shaft, eccentric shaft or crankshaft, is designated 26 in FIG. 3 and is journaled at its opposite ends in the illustrated right-hand frame assembly and also in the left-hand frame assembly which is not shown. Intermediate of the two frame assemblies the crankshaft 26 is provided with the usual cranks or eccentrics for reciprocating a conventional power press brake slide or ram.

Referring to FIG. 4, a quill 30 is fixed to side frame member 11 as by screws indicated at 31 and a rotatable sleeve 32 has anti-friction bearing in the quill or sleeve 30 as at 34 and 35. Sleeve 32 is rotatable with respect to flywheel shaft 15 and bearings designated 36 and 37 in FIG. 4 are interposed between shaft 15 and sleeve 32 and thus it will be noted that flywheel shaft 15, in addition to its bearing mounted in frame member 10 at 16, is indirectly rotatably suported in frame member 11 through sleeve 32 and quill 30.

A pair of driven clutch discs 40 and 41 are fixed, respectively, to the left-hand end of flywheel shaft 15, as viewed in FIG. 4, and to sleeve 32, and the means for selectively imparting driving rotation to either of the clutch discs 40 or 41 will now be briefly described.

A flywheel 42 is rotatably mounted upon the exterior periphery of the stationary quill or sleeve 30 preferably by means of anti-friction bearings 43 as illustrated in FIG. 4 and flywheel 42 comprises the driving member of the clutch mechanism which will now be described. It is to be understood that driving torque is transmitted to the flywheel 42 in the first instance by an electric driving motor which may be belt connected to the flywheel 42 in a conventional manner.

A dual clutch mechanism is employed for selectively connecting the rotating flywheel 42 to either the shaft 15 or the sleeve 32 through either of the clutch plates 40 or 41, respectively. It is sufficient for present purposes to point out that the clutch housing comprises a series of rigidly connected annular members 45, 46, 47 and 48 which are fixed against the flywheel. An axially movable pressure member 50 is shiftable either to the left or the right, as viewed in FIG. 4, to engage either the clutch plate 40 or the clutch plate 41 against the adjacent clutch housing portion.

A clutch shifter 52 is connected to the pressure member 50 to move axially therewith and clutch operation to either the left or the right is attained by applying operating air pressure through passages 54 or 55 to direct the same against flexible diaphragms 56 or 57, respectively, to impart the desired axial reciprocatory movement to the clutch shifter 52 and thereby to the clutch pressure member 50. To secure this joint axial reciprocation of pressure member 50 and shifter 52 the two parts may be pinned, as shown in FIG. 4, to rods 53 which are slidably mounted in clutch housing members 45 through 48.

Rods 53 have reduced end portions 54 and compression coil springs 58 encircle the same between spring collars 75 and 76 held on reduced end portions 54 by nuts 77. The spring-carrying reduced end portions 54 of rods 53 are disposed in counterbores formed in flywheel 42, as shown in FIG. 4.

The foregoing provides a balanced spring force normally centering pressure member 50 between clutch discs 40 and 41. Movement of members 50 and 52 to the right, as shown in FIG. 4, is yieldably resisted by action of the spring collars 75 against coil spring 58 and movement of the members 50 and 52 to the left is yieldably resisted by action of the spring collars 76 against the coil springs 58. The desired high speed and low speed operation of the final or crankshaft of the present invention is produced in a manner and by means which will now be described.

When the pressure passage 54 is activated and shifter 52 is moved to the left to connect the flywheel 42 and the clutch housing to the clutch plate 40 to drive the flywheel shaft 15 directly with the flywheel, a pinion 60 on the flywheel shaft drives an intermediate gear 61 on intermediate shaft 24 and a so-called bull-pinion 63 which is also fixed to intermediate shaft 24 drives a bull gear 64 on the final or main shaft 26 of the press brake. In FIG. 3 the pinion 60 lies directly behind a pinion designated 66 which will presently be described, the pinion 66 being offset from the plane of pinion 60 and intermediate gear 61. The foregoing is the approach or high speed phase of the downstroke driving cycle of the press brake ram.

Operating pressure is introduced to the passages at the end of shaft 15 by means of a conventional rotary seal assembly or rotary union designated 58 in FIG. 4. When the pressure is transferred from passage 54 to passage 55 (by conventional valve means which may be operated from a cam on the main shaft 26 in a well known manner) and shifter 52 is consequently moved to the right to connect the flywheel 42 and the clutch housing to the clutch plate 41 to drive the sleeve 32, further intermediate gearing comes into play to produce slower speed and higher torque rotation of the final or main shaft 26.

At its right hand end as viewed in FIG. 4, sleeve 32 has fixed thereto or formed thereon a drive pinion 66 which meshes with an idler pinion 67 on an idler shaft 68 and pinion 67 meshes with a reducer gear 70 fixed to low speed shaft 25. A pinion 71 which is likewise fixed to idler shaft 25 meshes with intermediate gear 61 on intermediate shaft 24 and the remainder of the drive is the same as in the high speed approach portion, through the pinion 63 and bull gear 64.

Since all of the gears and pinions of the foregoing two speed drive arrangement are constantly in mesh, the flywheel shaft 15 rotates idly during the last described low speed, high torque portion of the driving cycle, but without bearing the driving torque, so that shaft 15 need not be proportioned to bear the increased torque incident to the speed reduction brought about by the gearing 66, 67, 70 and 71, as in certain back gear drive arrangements heretofore proposed in the prior art for this general purpose of providing an automatic two-speed stroke cycle for power press brakes.

FIG. 5 shows merely by way of example a means for supplying operating air pressure for high and low speed operation in timed relationship during the driving cycle. A cam 80 is fixed to the main or eccentric shaft 26 of the press brake and acts against a follower 81 which is adapted to reciprocate a slide valve 82 in a valve housing 83. Operating air pressure is introduced to housing 83 at 84 and the conduits 85 and 86 lead respectively to the pressure passages 54 and 55.

During the major portion of the operating cycle valve 82 is in the position illustrated in FIG. 5 but during the final phase of the down stroke portion of the operating cycle a lobe 88 shifts valve 82 to transfer operating air pressure from conduit 85 to conduit 86. An arcuately shiftable plate 89 may be provided to adjust the effective length of lobe 88 to adjust the relatively short low speed portion of the operating cycle.

I claim:

1. In a power press brake, automatic transmission means providing a relatively rapid approach speed and a slower terminal speed in the working stroke of said press brake, said transmission means comprising a rigid upright frame member having a quill fixed thereto and projecting laterally therefrom, a drive wheel rotatably mounted upon said quill at one side of said frame member, a sleeve rotatably mounted within said quill and a shaft rotatably mounted within said sleeve, means axially outwardly of said drive wheel for selectively and alternatively coupling said shaft and said sleeve to said drive wheel for rotation thereby, a rotatably mounted driven shaft parallel to said sleeve mounted shaft and disposed at the opposite side of said frame member from said drive wheel, a pinion on said sleeve mounted shaft and a gear on said driven shaft in mesh with said pinion, a second pinion in mesh with said driven shaft gear, a pinion fixed to said sleeve, and reduction gearing acting between said sleeve fixed pinion and said second driven shaft gear pinion.

2. In a power press brake, automatic transmission means providing a relatively rapid approach speed and a slower terminal speed in the working stroke of said press brake, said transmission means comprising a rigid upright frame member, a drive wheel at one side of said frame member, a sleeve coaxial with and rotatable relative to said drive wheel and a shaft rotatably mounted within said sleeve, means axially outwardly of said drive wheel for selectively and alternatively coupling said shaft and said sleeve to said drive wheel for rotation thereby, a rotatably mounted driven shaft parallel to said sleeve mounted shaft and disposed at the opposite side of said frame member from said drive wheel, a pinion on said sleeve mounted shaft and a gear on said driven shaft in mesh with said pinion, a second pinion in mesh with said driven shaft gear, a pinion fixed to said sleeve, and reduction gearing acting between said sleeve fixed pinion and said second driven shaft gear pinion.

3. In a power press brake, automatic transmission means providing a relatively rapid approach speed and a slower terminal speed in the working stroke of said press brake, said transmission means comprising a rigid upright frame member having a quill fixed thereto and projecting laterally therefrom, a drive wheel rotatably mounted upon said quill at one side of said frame member, a sleeve rotatably mounted within said quill and a shaft rotatably mounted within said sleeve, means axially outwardly of said drive wheel for selectively and alternatively coupling said shaft and said sleeve to said drive wheel for rotation thereby, a rotatably mounted driven shaft parallel to said sleeve mounted shaft and disposed at the opposite side of said frame member from said drive wheel, a pinion on said sleeve mounted shaft and a gear on said driven shaft meshing therewith, a pair of jack shafts parallel to said sleeve and said driven shaft, pinion and gear connections between said sleeve and one of said jack shafts and between said one jack shaft and the other, and a pinion on said other jack shaft in mesh with said driven shaft gear.

4. In a power press brake, automatic transmission means providing a relatively rapid approach speed and a slower terminal speed in the working stroke of said press brake, said transmission means comprising a rigid upright frame member, a drive wheel at one side of said frame member, a sleeve coaxial with and rotatable relative to said drive wheel and a shaft rotatably mounted within said sleeve, means axially outwardly of said drive wheel for selectively and alternatively coupling said shaft and said sleeve to said drive wheel for rotation thereby, a rotatably mounted driven shaft parallel to said sleeve mounted shaft and disposed at the opposite side of said frame member from said drive wheel, a pinion on said sleeve mounted shaft and a gear on said driven shaft meshing therewith, a pair of jack shafts parallel to said sleeve and said driven shaft, pinion and gear connecting between said sleeve and one of said jack shafts and between said one jack shaft and the other, and a pinion on said other jack shaft in mesh with said driven shaft gear.

5. In a power press brake having side frame structures at opposite sides thereof each comprising spaced rigidly connected inner and outer wall members, automatic transmission means asosciated with the spaced inner and outer wall members of one of said side frame structures and adapted to provide a rapid approach speed and a slow terminal speed successively in each working stroke of the press brake, a quill fixed to the inner wall member of said side frame structure and extending inwardly therefrom toward the center of the press brake, a sleeve rotatably mounted in said quill and projecting axially beyond said quill in both directions, a shaft rotatably mounted within said sleeve and projecting axially beyond the same in both directions, said shaft having its outer end journaled in the outer wall member of said frame structure, a drive wheel rotatably mounted on said quill and duplex clutch means associated therewith and successively engageable with the adjacent projecting portions of said shaft and said sleeve for alternatively rotating the same, a driven shaft rotatably mounted in said inner and outer wall members, a pinion on said sleeve mounted shaft between said wall members and a mating gear on said driven shaft, a pinion on said sleeve between said wall members, a second pinion in mesh with said driven shaft gear, and reduction gearing in driving engagement between the pinion on said sleeve and said second driven shaft gear pinion.

6. In a power press brake having side frame structures at opposite sides thereof each comprising spaced rigidly connected inner and outer wall members, automatic transmission means associated with the spaced inner and outer wall members of one of said side frame structures and adapted to provide a rapid approach speed and a slow terminal speed successively in each working stroke of the press brake, a quill fixed to the inner wall member of said side frame structure and extending inwardly therefrom toward the center of the press brake, a sleeve rotatably mounted in said quill and projecting axially beyond said quill in both directions, a shaft rotatably mounted within said sleeve and projecting axially beyond the same in both directions, said shaft having its outer end journaled in the outer wall member of said frame structure, a drive wheel rotatably mounted on said quill and duplex clutch means associated therewith and successively engageable with the adjacent projecting portions of said shaft and said sleeve for alternatively rotating the same, a driven shaft rotatably mounted in said inner and outer wall members and having a gear fixed thereto, a pinion on said sleeve mounted shaft between said wall members in mesh with said gear, a pair of jack shafts mounted between said inner and outer wall members, pinion and gear connections between said sleeve and one of said jack shafts and between said one jack shaft and the other, and a pinion on said other jack shaft in mesh with said driven shaft gear.

7. In a power press brake having side frame structures at opposite sides thereof each comprising spaced rigidly connected inner and outer wall members, automatic transmission means associated with the spaced inner and outer wall members of one of said side frame structures and adapted to provide a rapid approach speed and a slow terminal speed successively in each working stroke of the press brake, a rotatable sleeve projecting axially through the inner wall member of said frame structure in both directions, a shaft rotatably mounted within said sleeve and projecting axially beyond the same in both directions, said shaft having its outer end journaled in the outer wall member of said frame structure, a rotatable drive wheel disposed coaxially of said sleeve and shaft at the inner side of said inner wall member, duplex clutch means associated with said drive wheel and successively engageable with the adjacent projecting portions of said shaft and said sleeve for alternatively rotating the same, a driven shaft rotatably mounted in said inner and outer wall members and having a gear fixed thereto, a pinion on said sleeve mounted shaft between said wall members in mesh with said gear, a pair of jack shafts mounted between said inner and outer wall members, pinion and gear connections between said sleeve and one of said jack shafts and between said one jack shaft and the other, and a pinion on said other jack shaft in mesh with said driven shaft gear.

8. In a power press brake having side frame structures at opposite sides thereof each comprising spaced rigidly connected inner and outer wall members, automatic transmission means associated with the wall members of one of said side frame structures and adapted to provide a rapid approach speed and a slow terminal speed successively in each working stroke of the press brake, a rotatable sleeve projecting axially through one of the wall members of said frame structure in both directions, a shaft rotatably mounted within said sleeve and projecting axially beyond the same in both directions, said shaft having one end thereof journaled in the other of the wall members of said frame structure, a rotatable drive wheel disposed coaxially of said sleeve and shaft at the side of said one wall member remote from said other wall member, duplex clutch means associated with said drive wheel and successively engageable with the adjacent projecting portions of said shaft and said sleeve for alternatively rotating the same, a driven shaft rotatably mounted between said wall members, a gear fixed to said driven shaft, a pinion fixed to said sleeve mounted shaft between said wall members in mesh with said gear, a pair of jack shafts mounted between said wall members, pinion and gear connections between said sleeve and one of said jack shafts and between said one jack shaft and the other, and a pinion on said other jack shaft in mesh with said driven shaft gear.

References Cited in the file of this patent

UNITED STATES PATENTS

| | | |
|---|---|---|
| 2,375,440 | Roche | May 8, 1945 |
| 2,793,537 | Schmitter | May 28, 1957 |
| 2,856,044 | Koenig et al. | Oct. 14, 1958 |
| 2,924,983 | Curran | Feb. 16, 1960 |